United States Patent
Kim et al.

(10) Patent No.: US 9,131,384 B2
(45) Date of Patent: Sep. 8, 2015

(54) METHOD AND APPARATUS FOR NOTIFYING A NODE IN A MULTI-NODE SYSTEM

(75) Inventors: Sunam Kim, Anyang-si (KR); Jinyoung Chun, Anyang-si (KR); Kitae Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 13/989,388

(22) PCT Filed: Nov. 22, 2011

(86) PCT No.: PCT/KR2011/008932
§ 371 (c)(1), (2), (4) Date: May 23, 2013

(87) PCT Pub. No.: WO2012/070847
PCT Pub. Date: May 31, 2012

(65) Prior Publication Data
US 2013/0242877 A1    Sep. 19, 2013

Related U.S. Application Data

(60) Provisional application No. 61/417,219, filed on Nov. 25, 2010.

(51) Int. Cl.
- *H04W 16/26* (2009.01)
- *H04W 48/08* (2009.01)
- *H04W 28/16* (2009.01)
- *H04B 7/02* (2006.01)
- *H04W 88/08* (2009.01)

(52) U.S. Cl.
CPC .......... *H04W 16/26* (2013.01); *H04B 7/024* (2013.01); *H04W 28/16* (2013.01); *H04W 48/08* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 7,986,915 B1 * | 7/2011 | Wang et al. | 455/7 |
| 2007/0097945 A1 * | 5/2007 | Wang et al. | 370/349 |
| 2009/0116422 A1 * | 5/2009 | Chong et al. | 370/315 |
| 2011/0105184 A1 * | 5/2011 | Piirainen et al. | 455/562.1 |
| 2011/0317652 A1 * | 12/2011 | Kim et al. | 370/329 |

FOREIGN PATENT DOCUMENTS

KR    10-2009-0088086    8/2009

OTHER PUBLICATIONS

Zte, "Introduction of TP for Improvements of distributed antenna for 1.28Mcps TDD," 3GPP TSG-RAN WG1 #63, R1-106268, Nov. 2010, 7 pages.
Ericsson, "The need for PLMN civic address location format," 3GPP TSG-RAN WG3 #69bis, R3-102889, Oct. 2010, 2 pages.
PCT International Application No. PCT/KR2011/008932, Written Opinion of the International Searching Authority dated Jul. 31, 2012, 12 pages.

* cited by examiner

*Primary Examiner* — Anh-Vu Ly
*Assistant Examiner* — Roberta A Shand
(74) *Attorney, Agent, or Firm* — Lee, Hong, Degerman, Kang & Waimey

(57) ABSTRACT

The present description relates to a method for notifying at least one node being used from among a plurality of nodes in a multi-node system including the plurality of nodes and a base station for controlling the plurality of nodes, wherein the method comprises a step in which a terminal determines, from the table preemptively shared with the base station, an index for indicating at least one node to be notified; and a step in which the terminal performs communication with the base station using the determined index.

15 Claims, 5 Drawing Sheets

Conventional RAN structure
(3 Sector cell site)

BTS hotel and Small cell RAN structure having DAS
(each hexagon is a cell site)

METHOD AND APPARATUS FOR NOTIFYING A NODE IN A MULTI-NODE SYSTEM

CROSS-REFERENCE TO RELATED APPLICATIONS

This application is the National Stage filing under 35 U.S.C. 371 of International Application No. PCT/KR2011/008932, filed on Nov. 22, 2011, which claims the benefit of U.S. Provisional Application Ser. No. 61/417,219, filed on Nov. 25, 2010, the contents of which are all hereby incorporated by reference herein in their entirety.

FIELD OF THE INVENTION

The present invention relates to a multi-node system. And, more particularly, the present invention relates to notifying of nodes in a multi-node system.

BACKGROUND ART

Recently, the data transmission capacity of a wireless (or radio) communication network has been increasing at a vast rate. This is due to the advent and supply of diverse devices, such as smart phones, tablet PCs, and so on, which require Machine-to-Machine (M2M) communication and a high data transmission capacity. Technologies efficiently using a larger number of frequency bands, such as a carrier aggregation technology, cognitive radio technology, and so on, and technologies for increasing the data capacity within a limited frequency, such as multiple antenna technology, coordinated multiple base station technology (or coordinated multi-point technology), and so on, have recently been highlighted for being capable of meeting with the required high data transmission capacity.

Additionally, the radio (or wireless) network is evolving into a network having greater node density capable of accessing the surroundings of a user. Herein, although a node may refer to an antenna of a group of antennae being spaced apart from a distributed antenna system (DAS) at a predetermined distance, the meaning will not be limited only to this and may, therefore, be used to have a broader meaning. More specifically, a node may correspond to a pico-cell base station (PeNB), a home base station (HeNB), an RRH (remote radio head), an RRU (remote radio unit), a relay, a distributed antenna, a port, and so on.

A wireless (or radio) communication system being equipped with such high-density nodes may demonstrate a greater system performance due to the coordination (or cooperation) between the nodes. More specifically, when each of the nodes has its transmission and reception (or tranception) managed by a single control station, so as to collectively operate as an antenna (or antenna group) of a single cell, a more excellent system performance may be demonstrated as compared to when each node operates as an independent base station (Base Station (BS), Advanced BS (ABS), Node-B (NB), eNode-B (eNB), Access Point (AP), and so on). In this case, a distributed multi-node system may be referred to as a distributed antenna system (DAS).

Therefore, a method for configuring nodes that are being used in a distributed multi-node system, which provides services to a user equipment by using multiple nodes, and a user equipment that operates by using such method is being required.

DETAILED DESCRIPTION OF THE INVENTION

Technical Objects

This description relates to a method for notifying of nodes enabling a base station and a user equipment to share feedback or transport (or transmission) methods, and so on, in a distributed multi-node system.

Additionally, this description also relates to a method enabling a base station and a user equipment to reduce an overhead of the distributed multi-node system and to share coordination (or combination) information on a node from a plurality of nodes.

Technical Solutions

According to an embodiment of the present invention, a method for notifying of at least one node which is being used among a plurality of nodes in a multi-node system including the plurality of nodes and a base station controlling the plurality of nodes is disclosed. The method includes the steps of determining, at a user equipment, an index indicating at least one node which is to be notified of from a table shared with the base station; and performing, at the user equipment, a communication with the base station by using the determined index.

The exemplary embodiment or other exemplary embodiments may include any one of the characteristics described below.

The table may be configured to list a combination of each node in accordance with a pre-determined rule. Also, the pre-determined rule may indicate that the combination comprises a combination grouped in accordance with a number of each node. Additionally, the pre-determined rule may indicate that, among groups having the same number of nodes in the combination, groups having the same greatest node or smallest node may be regrouped. Moreover, the pre-determined rule may indicate that the combination is aligned.

Also, the table may correspond to a table being reconfigured of only a combination of a number of nodes being less than or equal to a number of nodes providing service to the user equipment, among the plurality of nodes. Additionally, in the determining of the index, the index may be indexed within the reconfigured table. Moreover, the method may further include transmitting, at the user equipment, the number of nodes that is to be notified of to the base station. And, the method may also further include transmitting, at the base station, the number of nodes that is to be notified of to the user equipment.

Furthermore, when the user equipment is required to indicate a plurality of combinations, an order of the plurality of combinations may be aligned in accordance with an index order.

Also, the table may correspond to a table reconfigured, so as to exclude a combination being configured to include non-consecutive nodes.

And, the table may correspond to a table reconfigured, so as to exclude a combination including or not including a specific node, among the plurality of nodes. Moreover, the method may further include performing, at the user equipment, a communication with the base station by using information about the specific node.

Additionally, the method may further include a step of transmitting, at the user equipment, control information with respect to a node being indicated by the determined index to the base station.

Meanwhile, according to another exemplary embodiment, a user equipment for notifying of at least one node which is being used among a plurality of nodes in a multi-node system including the plurality of nodes and a base station controlling the plurality of nodes may comprise a transceiver performing a communication with the base station through the at least one node; and a controller controlling the transceiver, wherein the controller may determine an index indicating at least one node which is to be notified of from a table shared with the base station and may perform a communication with the base station by using the determined index.

Effects of the Invention

According to the node notification method according to the exemplary embodiment disclosed in this description of the present invention, among a plurality of nodes, information on the nodes that are to be notified of may be shared by the base station and the user equipment.

Additionally, the base station and the user equipment may share the information on the nodes by using only index information instead of information on the entire nodes.

Furthermore, in sharing configuration information on the nodes, the base station and the user equipment may reduce signaling overhead.

BEST MODE FOR CARRYING OUT THE PRESENT INVENTION

Figure 1:
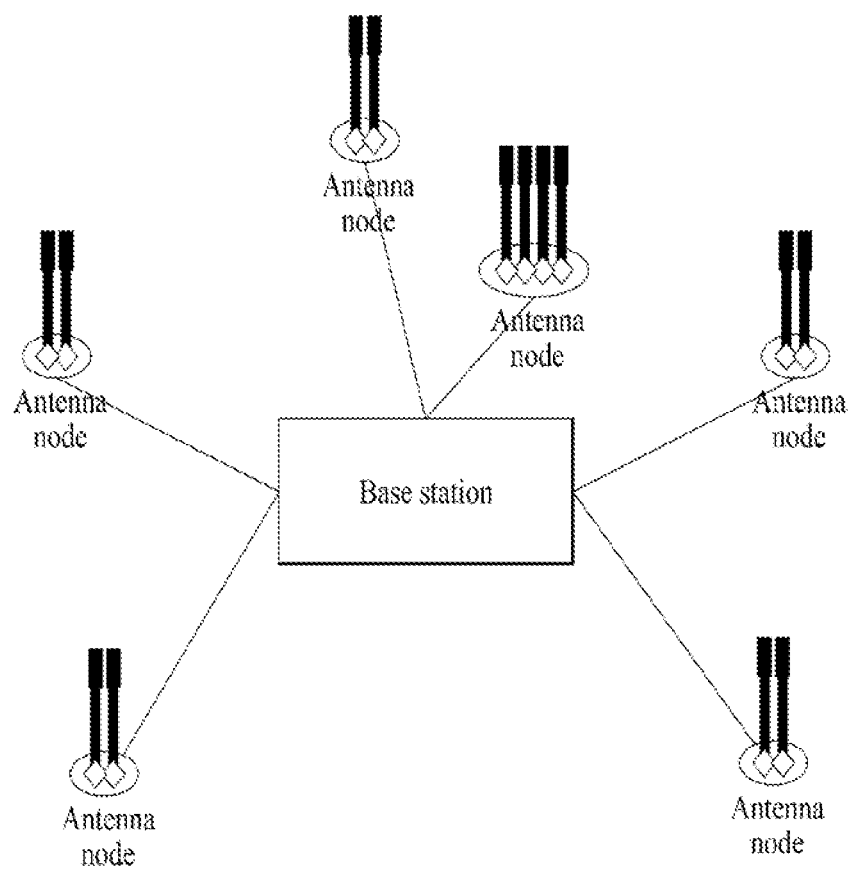
FIG. 1 illustrates an exemplary distributed multi-node system.

Hereinafter, reference will now be made in detail to the accompanying drawings of the exemplary embodiments of the present description. It should be noted that, in the following detailed description of the present invention, only the necessary parts required for understanding the operation according to the present description will be described and that the description of other parts will be omitted in order to avoid deviating from the essential concept (or idea or point) of the present invention.

The embodiments of the present invention described below correspond to a predetermined form of assembly of the elements and characteristics of the present invention. If not mentioned otherwise, each element or characteristic of the present invention should be selectively considered. Also, each element or characteristic of the present invention may also be embodied without being assembled or combined with other elements or characteristics of the present invention. Furthermore, the embodiments of the present invention may be configured by assembling or combining part of the elements and/or characteristics of the present invention. The order of the operations described in the embodiments of the present description may be altered (or varied). And, some of the elements or characteristics of any one embodiment of the present invention may be included in any other embodiment, or may replace the respective element or characteristic of the other embodiment of the present invention.

The specification of the present invention mainly describes the data-transmission and data-reception relation between a base station and a terminal Herein, the base station has its significance as a terminal node of a network directly performing communication with the terminal. In the description of the present invention, specific operations described to be performed by the base station may also be, in some occasion, performed by an upper node of the base station.

More specifically, it will be apparent that, in a network configured of multiple network nodes, a variety of operations performed in the network in order to communicate with the terminal may be performed by the base station or by other network nodes that do not belong to the base station. At this point, the term 'Base Station' may also be replaced with other terms, such as a fixed station, Node B, eNode B (eNB), access point, and so on. Furthermore, the term 'user terminal' may be replaced with other terms, such as UE (User Equipment), SS (Subscriber Station), MSS (Mobile Subscriber Station), and so on.

The embodiments of the present description may be realized by a variety of means. For example, the embodiments of the present description may be realized as hardware, firmware, or software, or in a combined form of two or more of hardware, firmware, and software.

When configuring the embodiment of the present description in the form of hardware, a method according to the embodiments of the present invention may be realized by using one or more of ASICs (application specific integrated circuits), DSPs (digital signal processors), DSPDs (digital signal processing devices), PLDs (programmable logic devices), FPGAs (field programmable gate arrays), a processor, a controller, a micro-processor, a micro-controller, and so on.

When configuring the embodiment of the present description in the form of firmware or software, a method according to the embodiments of the present description may be realized in the form of a module, procedure, or mathematical function performing the functions or operations described in the specification of the present invention. A software code may be stored in a memory unit so as to be configured by a processor. The memory unit may be placed inside or outside of the processor, thereby being capable of sending and receiving data with the processor through a variety of previously disclosed means.

The specific terms used in the description of the present invention are merely provided to help and facilitate the understanding of the present invention. The usage of such term may vary within the technical scope and spirit of the present description.

Unlike a Centralized Antenna System (CAS), wherein base station (BS, BTS, Node-B, eNode-B) antennae are concentrated at the center of a cell, a distributed multi-node system (DMNS) or a Distributed Antenna System (DAS) refers to a system that manages antenna nodes, which are scattered (or dispersed) to diverse positions within a cell, through a single base station.

The distributed multi-node system and the DAS, which are mentioned in the present description are given the same meaning and may be used in combination.

Additionally, as described above, an antenna node indicates an antenna (port) group or a DA, and each of the terms 'antenna node', 'antenna port group', and 'DA' may be used in combination in the present description.

The distributed multi-node system is differentiated from a femto/pico cell in that multiple antenna nodes configure a single cell. The initial purpose of the distributed multi-node system was to perform repetition by additionally installing mode antenna nodes in order to cover for shadow areas (or regions). However, in a broader perspective, the distributed multi-node system may be viewed (or considered) as a type of multiple input multiple output (MIMO) system in light of the fact that base station antennae receive or send multiple data streams at the same time, so as to be capable of supporting a single user or multiple users. And, due to its high spectral efficiency, the MIMO system is being recognized as an essential requirement for satisfying the needs in the next generation communication.

In light of the MIMO system, the distributed multi-node system has the advantages of gaining high power (or energy) efficiency, since the distance between the user and the antenna becomes smaller as compared to the CAS, a greater channel capacity due to low correlation and interference between base station antennae, ensuring communication performance of relatively equal and uniform quality regardless of the position of the user within the cell, and so on.

FIG. 1 illustrates an exemplary distributed multi-node system.

Referring to FIG. 1, the distributed multi-node system includes a base station and a plurality of nodes (or multiple nodes).

In the distributed multi-node system, when all nodes have their transmission and reception (or transception) managed by a single base station controller, so that each node can operate as a portion of a single cell, this system may be viewed (or considered) as a distributed antenna system (DAS) system. In the distributed antenna system (DAS), individual nodes may be assigned with separate node IDs, and the individual nodes may also operate as a partial antenna group within the cell without any separate node ID. In other words, the distributed antenna system (DAS) refers to a system having antennae (i.e., nodes) being dispersed (or distributed or scattered) in diverse locations within the cell and having such antenna managed by the base station. The distributed antenna system (DAS) is different from the related art Centralized antenna system (CAS) in that the antennae of the base station are concentrated at the center of the cell.

In FIG. 1, a node that is marked as an antenna node may indicate a macro base station, pico cell base station (PeNB), home base station (HeNB), RRH (remote radio head), relay, distributed antenna, and so on. Such node may also be referred to as a point.

The antenna node is connected to the Base Station via wired/wireless connection, and one node may be configured to include a plurality of antennae. Generally, the antennae that belong to a single antenna node belong the same regional point (or position), wherein the distance between the most proximate antennae is within a few meters. The antenna node performs the function of an access point allowing the user equipment to access a network. In a multi-node system, the antenna node may be treated as the antenna itself. However, for an effective operation of the multi-node system, the antenna node is required to be differentiated from the antenna.

Figure 2A:
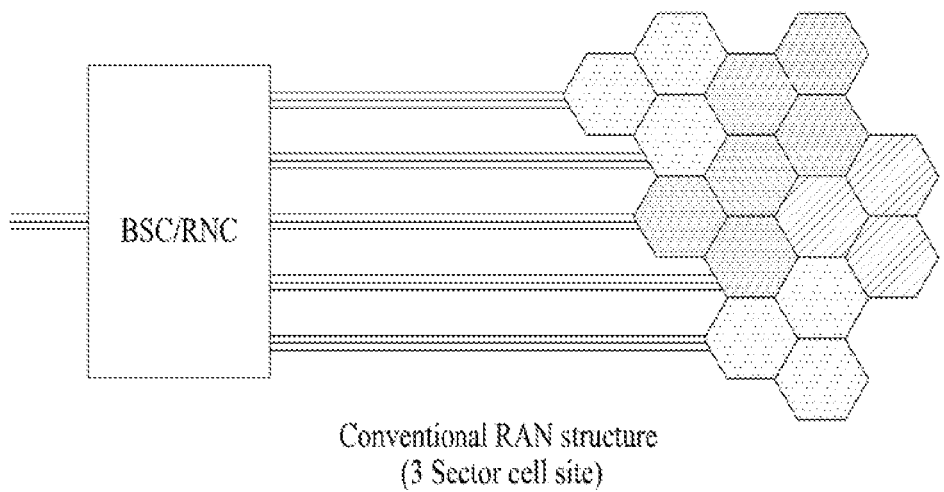
FIG. 2(a) illustrates a structure of a cellular system.
Figure 2B:
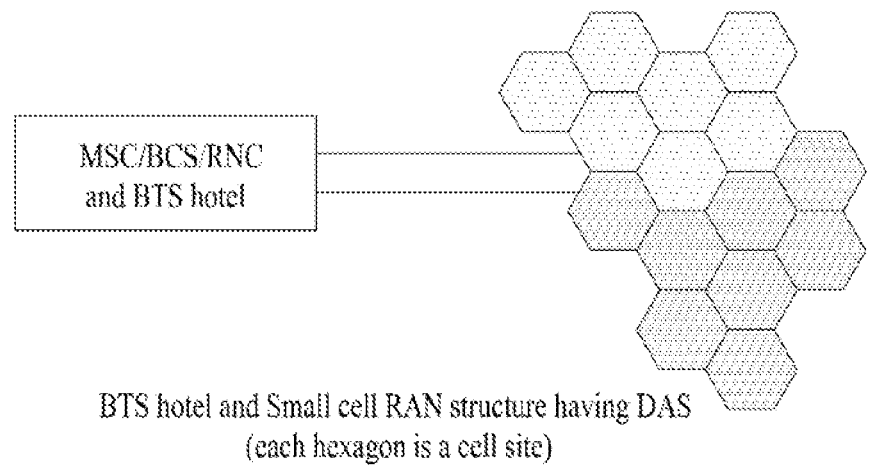
FIG. 2(b) illustrates a BTS hotel structure of a distributed multi-node system.

(a) of FIG. 2 illustrates a structure of a cellular system, and (b) of FIG. 2 illustrates a BTS hotel structure of a distributed multi-node system.

Referring to (a) of FIG. 2, in the conventional cellular system, a single base station (BTS) controlled three sectors, and each base station was connected to a BSC/RNC through a backbone network. However, as shown in (b) of FIG. 2, in the distributed multi-node system, the base stations that are connected to each antenna node may be grouped to one point (BTS hotel). Accordingly, the cost for the ground and building in which the base station is to be installed may be reduced, and the maintenance and management of the base station may be easily performed in one place. And, by installing the BTS and the MSC/BSC/RNC all in one place, backhaul capacity may be extensively increased.

Due to an extension in the implementation of the BTS hotel format, a cooperative communication between multiple nodes is facilitated. For the cooperative communication between multiple nodes, some of the nodes may be grouped to perform cooperative operations as a single cell (by assigning a single cell ID) (or Intra-cell cooperation), and Inter-cell cooperation may be applied to the grouped nodes. In the present description, an Intra-cell cooperation situation is mostly described. However, the applied technology may also be applied to the Inter-cell cooperation.

Therefore, this may be collectively referred to as a multiple node cooperation technology. More specifically, a distributed multi-node system may be used to collectively refer to a distributed multi-node system operating as a single cell and to a multi-cell system.

Hereinafter, exemplary embodiments of a node information sharing method for using evolved MIMO technologies, such as joint process or dynamic point selection, in the DAS or distributed multi-node system, which are proposed in the present description, and a mechanism for such method will be respectively described in detail.

The present description is to provide a description on a method for sharing information on nodes that are being used among a plurality of nodes configuring a distributed multi-node system.

In the distributed multi-node system, when the user equipment uses multiple nodes in order to perform communication with the base station, some of the nodes of the multiple nodes, which configure the distributed multi-node system, may be used. Accordingly, in sharing control information, such as channel information (e.g., CQI, PMI, and so on) between the user equipment and the multiple nodes, it is sufficient for the user equipment and the base station to share only the control information respective to the nodes that are being used and not the control information respective to all of the nodes configuring the distributed multi-node system.

For example, when the total number of nodes that can provide services to the user equipment corresponds to N, and when a number of nodes that are to be actually indexed among the N number of nodes corresponds to M (N??M), although the user equipment may be provided with services from a maximum of N number of nodes, this may indicate that, depending upon the circumstances of the base station, only M number of nodes are being used for the services. Therefore, among the total N number of nodes, it will be sufficient for the user equipment to feed-back only the control information respective to the M number of nodes that are to be notified of. In order to do so, the user equipment and the base station should share information one which nodes correspond to the M number of nodes among the N number of nodes configuring the distributed multi-node system.

Therefore, in the distributed multi-node system according to the exemplary embodiments disclosed in the present description, the user equipment and the base station may share information on the nodes that are to be notified of among the nodes configuring the distributed multi-node system. Most particularly, in sharing configuration information respective to a group of nodes being used for the communication between the user equipment and the base station, the present description proposes a method for effectively sharing the corresponding information while reducing overhead in the network system.

Hereinafter, a method for sharing information respective to nodes that are to be notified of by a user equipment and a base station in a distributed multi-node system will be disclosed.

Figure 3:
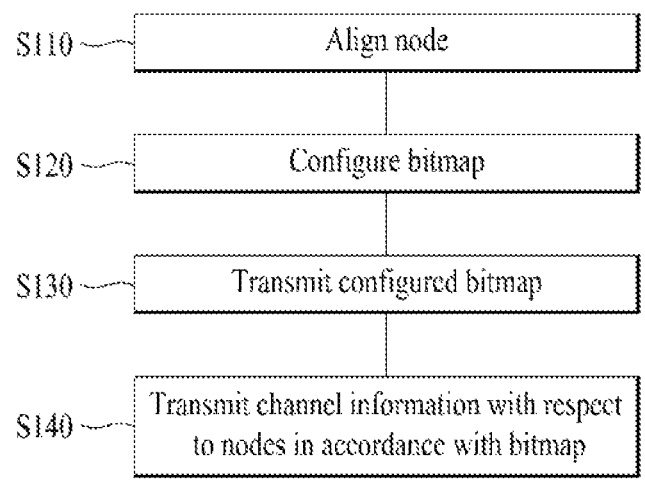
FIG. 3 illustrates a flow chart showing a method of sharing a list of nodes that are to be notified of by using a bitmap.

In a method for sharing node information according to an exemplary embodiment disclosed in the present description, the user equipment and the base station of the distributed multi-node system may directly share a list of nodes that are to be notified of by using a bitmap. FIG. 3 illustrates a flow chart showing a method of sharing a list of nodes that are to be notified of by using a bitmap.

First of all, the user equipment or the base station may align the nodes configuring the distributed multi-node system (S110). The method for sharing the list of nodes that are to be notified of by suing the bitmap may perform an alignment procedure on the entire nodes in order to reduce overhead in the system. The alignment standard that can be applied to the node alignments may correspond, for example, to a pathloss or a distance or a node identifier between each node and the user equipment.

Thereafter, the base station configures a bitmap indicating the nodes that are to be notified of (S120). The configured bitmap marks bits indicating the nodes that are to be notified of, among the entire nodes.

For example, when the user equipment may receive service from a maximum of 6 nodes (N=6), and when 3 nodes are to be notified of (M=3), the information on the 3 nodes that are to be shared between the user equipment and the base station may be indicated as shown below.

$$[Sn \in \{a,b,c,d,e,f\}], [Em \in \{a,d,e\}]$$ Equation 1

Herein, a to f represent an identifier of each node, Sn indicates a group of nodes from which the user equipment can receive service, and Em represents a group of nodes that are to be shared by the base station and the user equipment. Herein, the group of nodes respective to Em may be expressed in the form of a bitmap, such as [1, 0, 0, 1, 1, 0].

Since the number of nodes (N) through which the service can be received may vary for each user equipment, the size of the bitmap may be pre-defined by the system.

Subsequently, the base station transmits the configured bitmap to the user equipment (S130). By transmitting the bitmap to the user equipment, in a later process, the user equipment and the base station may be capable of knowing to which group of nodes the control information respective to the nodes correspond. The bitmap may be transmitted by using a control signal, such as RRC (Radio Resource Control) signaling or MAC (Medium Access Control) message.

Afterwards, the user equipment transmits control information, such as channel information respective to the nodes being indicated by the configured bitmap information, to the base station (S140). In this case, the base station may verify to which node the channel information corresponds based upon the transmitted bitmap information.

As a method of sharing information respective to nodes that are to be notified of between the user equipment and the base station, the above-described exemplary embodiment of the present invention discloses a structure having the base station transmit the node information that is to be notified of to the user equipment. However, the exemplary embodiment of the present description may also be implemented in the form of having the user equipment transmit the node information that is to be notified of to the base station. More specifically, as a similar example to the operations of the base station according to the above-described exemplary embodiment, the user equipment may transmit information on a group of nodes that are to be notified of to the base station by using a bitmap.

Meanwhile, in the method for sharing node information according to another exemplary embodiment disclosed in the present description, the user equipment and the base station of the distributed multi-node system may share a list of nodes that are to be notified of by using a table listing a group of nodes.

More specifically, by having the user equipment configure a table listing a group of nodes configuring the distributed multi-node system, and by having the user equipment share indexes of the configured table with the base station, the user equipment and the base station may share the list of nodes that are to be notified of. Herein, prior to sharing the indexes of the table, the user equipment and the base station configure in advance a table including the group of nodes within the system based upon a shared rule between the user equipment and the base station, and, thereafter, the table being configured in advance is used in order to share the indexes of the nodes that are to be notified of The table being configured in advance may be shared in advance by the user equipment and the base station.

Hereinafter, an applicable table configuration and indexing method for the exemplary embodiment of the method for sharing node information, which is disclosed in the present description, will first be described.

The table indicating the group of nodes that are to be notified of corresponds to a table that is configured to list a group of nodes, which is being used for the communication with the user equipment in accordance with the pre-determined rule from the entire nodes.

For example, when the maximum number of nodes ($N_{max}$) that is allowed fir configuring the distributed multi-node system is equal to 6, the group of nodes in the system may be determined as shown in Table 1.

TABLE 1

| Index | Em |
|---|---|
| 0 | {0} |
| 1 | {1} |
| 2 | {2} |
| 3 | {3} |
| 4 | {4} |
| 5 | {5} |
| 6 | {0, 1} |
| 7 | {0, 2} |
| 8 | {0, 3} |
| 9 | {0, 4} |
| 10 | {0, 5} |
| 11 | {1, 2} |
| 12 | {1, 3} |
| 13 | {1, 4} |
| 14 | {1, 5} |
| 15 | {2, 3} |
| 16 | {2, 4} |
| — | — |
| M − 1 | {1, 2, 3, 4, 5} |
| M | {0, 1, 2, 3, 4, 5} |

When the identifier of each node is marked from 0 to 5, and when the user equipment can receive service from the permitted nodes, Sn, which indicates the group of nodes from which the user equipment can receive services, may be expressed as {0, 1, 2, 3, 4, 5}. In this case, each group (Em) of nodes that configure the distributed multi-node system may be listed as shown in Table 1 in accordance with the number of each node.

The Em listed in Table 1 may be serially indexed so as to effectively indicate the group of nodes that are to be notified of to the user equipment. For example, when the user equipment and the base station share a table, which is configured as shown in Table 1, and when the index value is equal to 14, this may indicate group Em={1,5}, which indicates that, among the entire nodes, the nodes being indicated by identifiers 1 and 5 are to be notified of.

Since the number of nodes (N) that can provide services in the distributed multi-node system is given a different value for each user equipment, the table may be determined based upon the maximum number of nodes ($N_{max}$) configuring the distributed multi-node system. Additionally, the table may also be efficiently configured by having additional configuration rules applied thereto.

Hereinafter, table configuration rules that can be applied to the exemplary embodiments disclosed in the present description will be described. In order to have the user equipment and the base station share the table showing information on which nodes, among the entire nodes, are to be notified of, the table may be configured by adopting the following rules.

As a first rule (Rule 1), the table may be configured so that the group of nodes that are to be notified of can be grouped in accordance with a number of items. More specifically, the table may be configured so that the combination can be configured of a group, which is grouped in accordance with the number of each node, in accordance with the Rule 1.

Referring to the example of Table 1, Em may be grouped as shown below in Table 2 based upon cases when the number of items included in each group is equal to 1, 2, . . . , n, . . . , N.

TABLE 2

Group 1: {0} {1} {2} . . .
Group 2: {0, 1} {0, 2} . . .
Group 1: {0, 1, 2}, {1, 2, 3} . . .

As a second rule (Rule 2), among each group (Em) being indicated in accordance with the respective n value, the table may be configured, so that, in each item, combinations having the same greatest (or smallest) value can be grouped to the same group. More specifically, among the groups having the same number of nodes in one node combination, the greatest (or largest) node or the smallest node may be regrouped to configure the same group.

Referring to the example shown in Table 1, Em may be grouped as shown below in Table 3.

TABLE 3

Ex) When n = 2, items having the largest value are grouped as the same group

Group 2-2: {0, 1}
Group 2-3: {0, 2}, {1, 2}
Group 2-4: {0, 3}, {1, 3}, {2, 3}
Ex) When n = 2, items having the smallest value are grouped as the same group Group 2-1: {0, 1} {0, 2}, {0, 3}
Group 2-3: {1, 2} {1, 3}
Group 2-4: {2, 3}

As a third rule (Rule 3), the table may be configured so that the items included in the combination of each Em indicated in accordance with the n value can be aligned. For example, the items included in the combinations of each Em may be aligned by an increasing order or by a decreasing order.

Additionally, as a fourth rule (Rule 4), the table may be configured by having a portion of a table, which is determined in accordance with a maximum number of nodes, be regrouped in accordance with the size of the number of nodes N that can provide service to each user equipment. More specifically, the table may be reconfigured only of combinations, among the combinations configuring the table, having a number of nodes less than or equal to the number of nodes (N) that can provide service to the user equipment.

As described above, in the table that is configured by reconfiguring the entire table, the indexes may be regenerated. Table 4 shows indexes of the reconfigured table being regenerated by having Rule 4 applied thereto, when the number of nodes providing service to the user equipment is respectively equal to 3 and 2.

TABLE 4

| Ex) User equipment of N = 3 | | User equipment of N = 2 | |
|---|---|---|---|
| Index | Em | Index | Em |
| 0 | {0} | 0 | {0} |
| 1 | {1} | 1 | {1} |
| 2 | {2} | 2 | {0, 1} |
| 3 | {0, 1} | | |
| 4 | {0, 2} | | |
| 5 | {1, 2} | | |
| 6 | {0, 1, 2} | | |

In case of Table 4, since the index is reconfigured in accordance with each user equipment, for example, the combination of nodes indicated by 'Index 2' represents combination {2}, in case of the user equipment of N=3, and represents combination {0,1}, in case of the user equipment of N=2.

Furthermore, as a fifth rule (Rule 5), among the combinations configuring the table, the table may be configured to exclude the combinations having items indicating a specific format. More specifically, the combinations being excluded from the table correspond to items indicating the following formats.

1) Combinations wherein each of the items is not consecutive to one another may be excluded. For example, combinations including non-consecutive items, such as {0, 1, 3} or {0, 3, 4} may be excluded from the table.

2) Combinations including a particular item may be excluded from the table. If the specific item corresponds to a node that is essentially used in order to provide service, and that is, therefore, required to be used in all combinations, or if the usage of the specific node is limited and is, therefore, not used for services, the combinations including the specific node are not required for configuring the table and may, therefore, be excluded. For example, when the most essential node corresponds to item '0', all combinations including '0' may be excluded from the table.

3) Combinations that do not include a specific item may be excluded from the table. For example, when the base station requests for channel information respective to combinations having a specific node included therein, since the channel information respective to the combinations that do not include the specific node is unnecessary, the corresponding combinations may be excluded from the table.

Hereinafter, the exemplary embodiments of the detailed table configuration applying the above-described table configuration rules will be disclosed.

Equation 2 corresponds to a first exemplary embodiment of the method for configuring a table having the above-described Rule 1 to Rule 4 applied thereto.

$$I = \sum_{n=1}^{N} \sum_{i=1}^{n} \left( \begin{matrix} E_{n,i} \\ i \end{matrix} \right),$$

$$I \in \left\{ 0, \ldots, \sum_{n=1}^{N} \binom{N}{n} - 1 \right\}$$

Equation 2

In accordance to Equation 2, an index (I) respective to a random combination E∈

$\{E_{n,i}\}_{i=1}^{n}$ may be configured. Herein, $E_{n,i}$ indicates an i-th item of combination E having a number of items corresponding to n, and i=1, 2, n, and $0 \leq E_{n,i} \leq N-1$, and $E_{n,i} < E_{n,i+1}$. And, an extended binomial coefficient is defined as $$\left( \begin{matrix} x \\ y \end{matrix} \right) = \begin{cases} \binom{x}{y}, & x \geq y \\ 0, & x < y \end{cases}$$

(hereinafter the same).

For example, a table using indexes that are configured in accordance with Equation 2 with respect to a case when N=4 may be expressed as Table 5 shown below.

TABLE 5

| I | E |
|---|---|
| 0 | {0} |
| 1 | {1} |
| 2 | {2} |
| 3 | {3} |
| 4 | {0, 1} |
| 5 | {0, 2} |
| 6 | {1, 2} |
| 7 | {0, 3} |
| 8 | {1, 3} |
| 9 | {2, 3} |
| 10 | {0, 1, 2} |
| 11 | {0, 1, 3} |
| 12 | {0, 2, 3} |
| 13 | {1, 2, 3} |
| 14 | {0, 1, 2, 3} |

Meanwhile, Equation 3 corresponds to a second exemplary embodiment of the method for configuring a table having the above-described Rule 1 to Rule 4 applied thereto.

$$I = \sum_{n=1}^{N} \sum_{i=1}^{n} \left( \begin{matrix} N - E_{n,i} - 1 \\ n - i + 1 \end{matrix} \right),$$

$$I \in \left\{ 0, \ldots, \sum_{n=1}^{N} \binom{N}{n} - 1 \right\}$$

Equation 3

In accordance to Equation 3, an index (I) respective to a random combination E may be configured. Herein, $E_{n,i}$ indicates an i-th item of combination E having a number of items corresponding to n, and i=1, 2, n, and $0 \leq E_{n,i} \leq N-1$, and $E_{n,i} < E_{n,i+1}$.

For example, a table using indexes that are configured in accordance with Equation 3 with respect to a case when N=4 may be expressed as Table 6 shown below.

TABLE 6

| I | E |
|---|---|
| 0 | {0} |
| 1 | {1} |
| 2 | {2} |
| 3 | {3} |
| 4 | {2, 3} |
| 5 | {1, 3} |
| 6 | {1, 2} |
| 7 | {0, 3} |
| 8 | {0, 2} |
| 9 | {0, 1} |
| 10 | {1, 2, 3} |
| 11 | {0, 2, 3} |
| 12 | {0, 1, 3} |
| 13 | {0, 1, 2} |
| 14 | {0, 1, 2, 3} |

Meanwhile, a third exemplary embodiment of the method for configuring a table corresponds to a method for generating grouped indexes having Rule 1 to Rule 3 applied thereto.

Equation 4 indicates a method for generating a sub-index ($i_n$) in each combination of a group having n number of items in accordance with the above-described Rule 1.

$$i_n = \sum_{i=1}^{n} \left( \begin{matrix} E_{n,i} \\ i \end{matrix} \right),$$

$$i_n \in \left\{ 0, \ldots, \binom{N}{n} - 1 \right\}$$

Equation 4

An equation for indicating all combinations by using the sub-index generated in accordance with Equation 4 is expressed as Equation 5. At this point, it will be assumed that all user equipments can receive service from a maximum of $N_{max}$ number of nodes.

$$I = \sum_{n=1}^{N_{max}} \sum_{i=1}^{n} \left( \begin{matrix} E_{n,i} \\ i \end{matrix} \right),$$

$$I \in \left\{ 0, \ldots, \sum_{n=1}^{N_{max}} \binom{N_{max}}{n} - 1 \right\}$$

Equation 5

The table configured in accordance with Equation 5 may be expressed as Table 7 shown below.

TABLE 7

| $i_1$ | E | $i_2$ | E | $I_n$ | E | $in_{max}$ | E |
|---|---|---|---|---|---|---|---|
| 0 | {0} | 0 | {0, 1} | 0 | ... | 0 | {0, 1, 2, ..., $N_{max}-1$} |
| 1 | {1} | 1 | {0, 2} | 1 | ... | | |
| 2 | {2} | 3 | {0, 3} | 2 | ... | | |
| ... | ... | ... | ... | ... | ... | | |
| $N_{max}-1$ | {$N_{max}-1$} | $\binom{N_{max}}{2}-1$ | {2, 3} | $\binom{N_{max}}{n}-1$ | ... | | |

If the base station and the user equipment uses the table, which is expressed as shown in Table 7, and when the value n is first shared between the base station and the user equipment, more specifically, the index value for expressing the combinations indicating the nodes that are to be notified of may be sufficient by sharing only the sub-index value ($i_n$) within the group having n number of items. Since the sub-index value may be expressed as a maximum value of $$\binom{N_{max}}{n}-1,$$

the overhead for sharing this value may be reduced.

Meanwhile, prior to sharing the index indicating the detailed combination configuring the table, which is configured in accordance with the above-described exemplary embodiments, the base station and the user equipment may first share information enabling sub-sets of the table to recognize one another.

More specifically, prior to sharing the index value, the base station and the user equipment may first share at least one or more types of information among the maximum number of nodes ($N_{max}$), the number (N) of nodes that can provide service to the user equipment and the number (n) of nodes that are to be notified of to the user equipment. Accordingly, based upon the information that is first shared, the base station and the user equipment may share information on some of the combinations of the entire table between one another.

Additionally, the base station and the user equipment may share an indication value indicating that all combinations include a plurality of item numbers ($N_{max}$, N or n).

Also, the base station and the user equipment may share an indication value indicating that all combinations include a specific node.

Furthermore, the base station and the user equipment may share an indication value indicating that all combinations do not include a specific node.

As described above, when the indication value is required to indicate a plurality of combinations, the respective order of the combinations may be aligned in accordance to the order of the index, so that confusion can be prevented from occurring between the base station and the user equipment.

Figure 4:
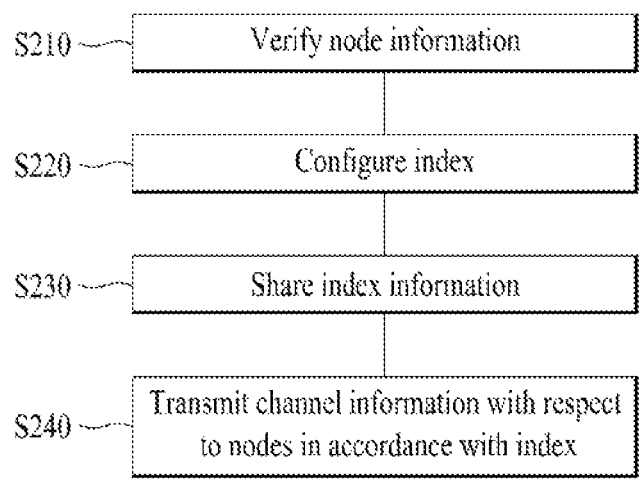
FIG. 4 illustrates a flow chart showing a method of sharing a list of nodes that are to be notified of by using indexes of a table.

FIG. 4 illustrates a flow chart showing a method of sharing a list of nodes that are to be notified of by using indexes of a table.

First of all, the user equipment verifies the node information (S210). The node information may correspond to information required for configuring a table, i.e., information on a maximum number of nodes ($N_{max}$) within the distributed multi-node system in accordance with the relation between the user equipment and the base station, a number (N) of nodes that can provide service to the user equipment, or a number (n) of nodes that is to be notified of to the user equipment. At this point, in order to reduce network overhead, the user equipment may transmit the node information in advance to the base station. Additionally, similarly, as described above, the method may be realized in a format of having the base station transmit the node information to the user equipment.

Thereafter, the user equipment configured a table or index respective to the nodes based upon the node information (S220). Herein, the user equipment may apply at least one or more of Rule 1 to Rule 4, so as to reconfigure the table or to regenerate indexes respective to the reconfigured table.

Subsequently, the user equipment and the base station share the index or table, which is generated by using the same method (S230). According to some exemplary embodiments, the index may correspond to a sub-index indicating some combinations of the reconfigured table. The index or information for generating the index may be transmitted by using a control signal, such as RRC (Radio Resource Control) signaling or MAC (Medium Access Control) message.

Finally, the user equipment transmits control information, such as channel information respective to the nodes, which are notified of by the index, to the base station (S240).

The other exemplary embodiment, which is described above, corresponds to a method for sharing information on nodes that are being used by using indexes between the user equipment and the base station, and, although other exemplary embodiment discloses a format of having the user equipment transmit index information to the base station, the exemplary embodiment may also be implemented so as to have the base station transmit the node information to the user equipment. More specifically, similarly to the operation of the user equipment according to the above-described other exemplary embodiment, the base station may use the table and index, so as to transmit information on the combination of nodes that are being used to the user equipment.

Figure 5:
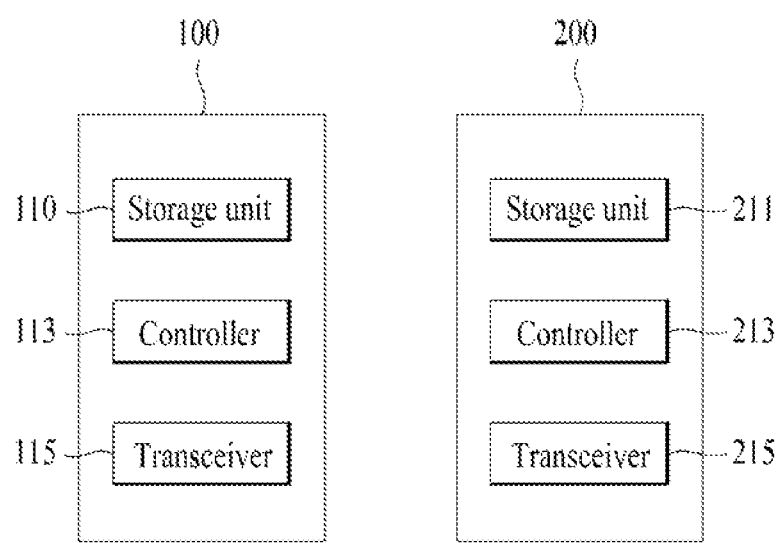
FIG. 5 illustrates block views of a user equipment and a base station of the distributed multi-node system according to an exemplary embodiment of the present invention.

FIG. 5 illustrates block views of a user equipment and a base station of the distributed multi-node system according to the exemplary embodiments of the present invention.

As shown in FIG. 5, the user equipment (100) is configured to include a storage unit (111), a controller (113), and a transceiver (or transmitter/receiver) (115), and the base station (200) is configured to include a storage unit (211), a controller (213), and a transceiver (or transmitter/receiver) (215).

The storage unit (111) and the storage unit (211) respectively store the methods shown in FIG. 3 to FIG. 4, and, by executing the methods stored in the storage unit (111), the controller (113) controls the storage unit (111) and the transceiver (or transmitter/receiver) (115), and, by executing the methods stored in the storage unit (211), the controller (213) controls the storage unit (211) and the transceiver (or transmitter/receiver) (215).

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The present invention may be realized in another concrete configuration (or formation) without deviating from the spiritual and essential characteristics of the present invention. Therefore, in all aspect, the detailed description of present invention is intended to be understood and interpreted as an exemplary embodiment of the present invention without limitation. The scope of the present invention shall be determined based upon a reasonable interpretation of the appended claims of the present invention and shall come within the scope of the appended claims and their equivalents. Additionally, claims that do not have any explicit citations within the scope of the claims of the present invention may either be combined to configure another embodiment of the present invention, or new claims may be added during the amendment of the present invention after the filing for the patent application of the present invention.

What is claimed is:

1. A method for communicating with a base station by a user equipment in a multi-node system including a plurality of nodes and the base station controlling the plurality of nodes, the method comprising:

determining, by the user equipment, an index for a table shared between the user equipment and the base station, the index indicating at least one node from among the plurality of nodes based on the table;

performing, by the user equipment, a communication with the base station using the at least one node indicated by the index wherein the index is determined using the following equations:

$$I = \sum_{n=1}^{N} \sum_{i=1}^{n} \binom{E_{n,i}}{i}, \ I \in \left\{0, \ldots, \sum_{n=1}^{N} \binom{N}{n} - 1\right\}$$

where I represents the index, $E_{n,i}$ represents an i-th element of a node group having n elements, N is an integer, and $$\begin{Bmatrix} x \\ y \end{Bmatrix}$$

is defined as:

$$\begin{Bmatrix} x \\ y \end{Bmatrix} = \begin{cases} \binom{x}{y}, & x \geq y \\ 0, & x < y \end{cases},$$

where $$\binom{x}{y}$$

represents a binomial coefficient.

2. The method of claim 1, wherein the table defines relations between indexes and node groups, each node group having at least one element corresponding to at least one of the plurality of nodes.

3. The method of claim 2, wherein the table is defined such that a lower index corresponds to a node group having a smaller number of elements.

4. The method of claim 2, wherein the table is defined such that a lower index corresponds to a node group having a lower maximum value among node groups having a same number of elements.

5. The method of claim 2, wherein the table is defined such that a lower index corresponds to a node group having a lower minimum value among node groups having a same number of elements.

6. The method of claim 1, wherein N represents a number of nodes which can provide a service to the user equipment.

7. The method of claim 6, further comprising:

transmitting, by the user equipment to the base station, information about the number of nodes.

8. The method of claim 1, further comprising;

transmitting, by the user equipment to the base station, information about the index.

9. The method of claim 1, further comprising:

transmitting, by the user equipment to the base station, control information with respect to the at least one node indicated by the index.

10. A user equipment configured to communicate with a base station in a multi-node system including a plurality of nodes and the base station controlling the plurality of nodes, the user equipment comprising:

a transceiver; and a controller operatively connected to the transceiver and configured to:

determine an index for a table shared between the user equipment and the base station, the index indicating at least one node from among the plurality of nodes based on the table;

perform a communication with the base station using the at least one node indicated by the index
wherein the index is determined using the following equations:

$$I = \sum_{n=1}^{N} \sum_{i=1}^{n} \left\langle \begin{array}{c} E_{n,i} \\ i \end{array} \right\rangle, \ I \in \left\{ 0, \ldots, \sum_{n=1}^{N} \binom{N}{n} - 1 \right\}$$

where I represents the index, $E_{n,i}$ represents an i-th element of a node group having n elements, N is an integer, and $$\left\langle \begin{array}{c} x \\ y \end{array} \right\rangle$$

is defined as:

$$\left\langle \begin{array}{c} x \\ y \end{array} \right\rangle = \begin{cases} \binom{x}{y}, & x \geq y \\ 0, & x < y \end{cases},$$

where $$\binom{x}{y}$$

represents a binomial coefficient.

11. The user equipment of claim 10, wherein the table defines relations between indexes and node groups, each node group having at least one element corresponding to at least one of the plurality of nodes.

12. The user equipment of claim 11, wherein the table is defined such that a lower index corresponds to a node group having a smaller number of elements.

13. The user equipment of claim 11, wherein the table is defined such that a lower index corresponds to a node group having a lower maximum value among node groups having a same number of elements.

14. The user equipment of claim 11, wherein the table is defined such that a lower index corresponds to a node group having a lower minimum value among node groups having a same number of elements.

15. The user equipment of claim 10, wherein N represents a number of nodes which can provide a service to the user equipment.

* * * * *